United States Patent Office 2,997,708
Patented Aug. 22, 1961

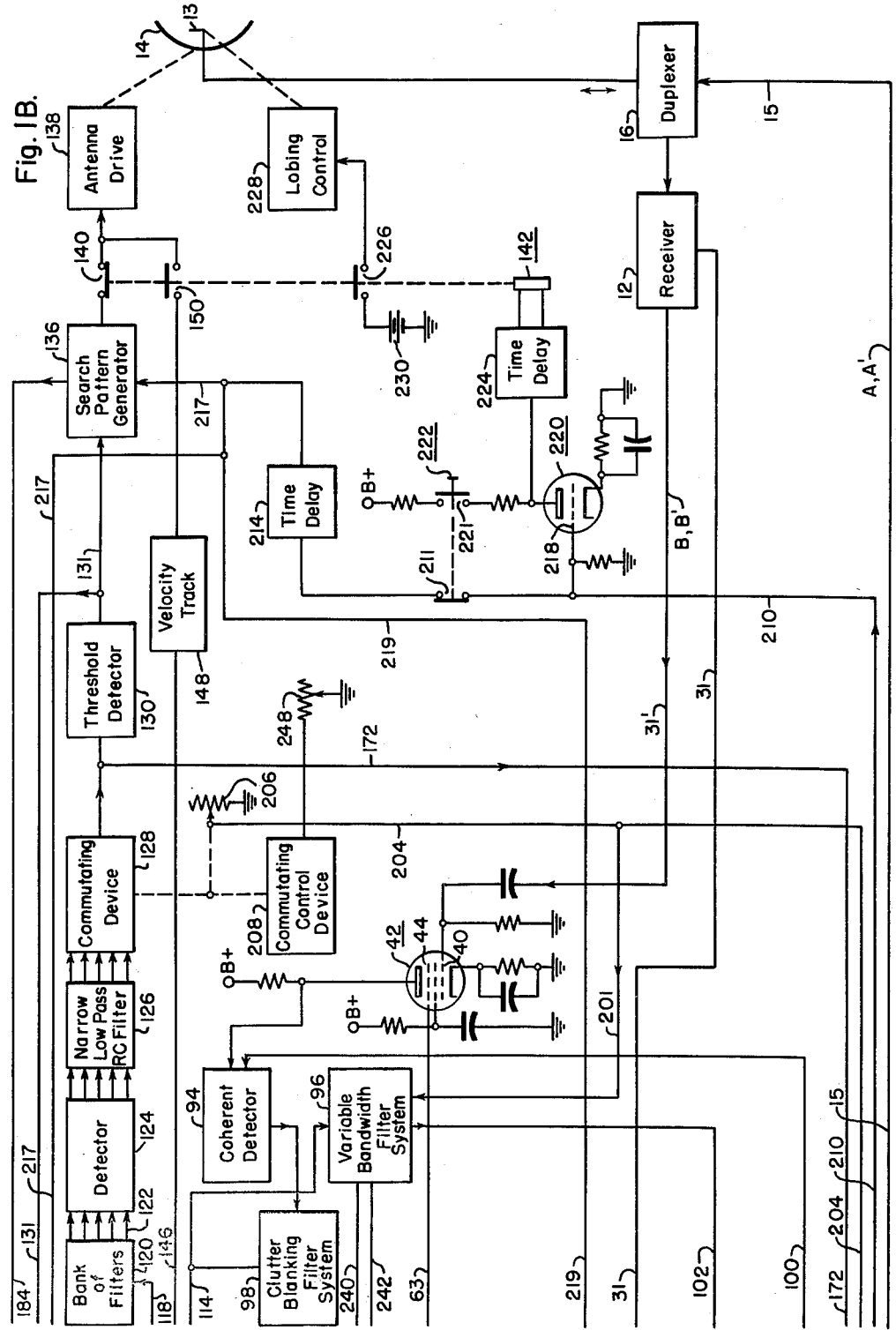

2,997,708
PULSE DOPPLER RADAR SYSTEM
Harry B. Smith, Catonsville, and David H. Mooney, Jr., Glen Burnie, Md., assignors to Westinghouse Electric Corporation, East Pittsburgh, Pa., a corporation of Pennsylvania
Filed June 13, 1956, Ser. No. 592,232
12 Claims. (Cl. 343—8)

This invention relates generally to pulse Doppler radar systems and more particularly to a pulse Doppler radar system designed to detect and track high velocity targets.

In a copending application, Serial No. 570,444, filed March 9, 1956, and assigned to the assignee of the present application, there is described a pulse Doppler radar system in which two values of the transmitted pulse repetition ferquency are employed which have a common submultiple. Initially, when the radar antenna of the system described in the aforesaid application is searching for a target, the first pulse repetition frequency is used. When a target is detected in the searching process, a tracking time gate is produced which, in effect, is a series of voltage pulses which have the same pulse repetition frequency and phase position as the target returns at this first pulse repetition frequency. The relative position of this gate is stored in a memory circuit by means of a direct current voltage. Then, the frequency of the transmitted pulses is changed to the second pulse repetition frequency and a second tracking gate is produced and its position is stored in a memory circuit. If the two tracking gates are passed through a coincidence gate, they will coincide periodically and produce an output pulse. These output pulses are then compared in phase with a series of pulses having a pulse repetition frequency equal to the difference between the first and second pulse repetition frequencies to produce a direct current output voltage which is proportional to true range.

In a pulse Doppler radar system of the type described above, a high duty cycle (i.e. ratio of pulse width to period of time between successive pulses) is desirable for search to achieve maximum range performance for a given expenditure of average power and a given time to periodically examine an angular region of space; whereas, a low duty cycle is desirable for acquisition and track to facilitate measurement of true range and to minimize problems in tracking through ambiguous range intervals between which the received echo may be eclipsed by a transmitted pulse. In order to achieve an acquisition range equal to the detection range and to insure maintenance of lock-on, it is desirable to maintain the same average transmitted power for the two conditions outlined above since this is the criterion determining range performance. Alternatively, the range performance can be shown to be approximately proportional to the ratio of the average value of transmitted power divided by the effective noise bandwidth of the receiver of the system which filters out the desired signal from ground clutter and other spurious signals by making use of the Doppler shift in ferquency. Consequently, the narrower the bandwidth, the greater the range performance. During and before acquisition of a target, however, it is desirable to have a relatively wide bandwidth in order to permit a faster build up of information about a target which may be traveling at any one velocity within a wide range of velocities; so it is all together desirable and usually necessary to provide filtering apparatus which will shift from a wide bandwidth during the search phase to a narrower bandwidth after detection of the target when tracking commences.

It is a primary object of this invention to provide a pulse Doppler radar system which meets the requirements outlined in the preceding paragraph. In carrying forth this object, the radar system of the present invention operates at a high duty cycle and wide bandwidth during search and, upon detection, switches to a lower duty cycle and narrower bandwidth to effect acquisition, range measurement and subsequent tracking in range, velocity, and angle. The average power of the pulses transmitted by the radar system during both phases of operation may be kept constant by appropriate adjustment of the peak power output of a klystron power amplifier in the radar transmitter when the system switches from one mode of operation to the other. Alternatively, the ratio of average power to effective bandwidth may be kept constant by changing the bandwidth to compensate for the change in average power.

A further object of the invention lies in the provision of means in a pulse Doppler radar system of the type described above for causing the radar antenna to pause momentarily when a target is detected and then to continue scanning in order to permit a build up of information concerning the target. Specifically, this information comprises the velocity, azimuth position, and range of the target. The principal purpose served by such a pause is the ability of the system to receive considerably more information from the target since a continuous train of such information is received during the time that the antenna is paused.

The above and other objects and features of the invention will become readily apparent from the following detailed description taken in connection with the accompanying drawings which form a part of this specification and in which:

FIGS. 1a and 1b, when placed end-to-end, constitute a schematic diagram of the radar system of the invention;

FIG. 4 is an illustration of the output waveform of the various range search and storage circuits illustrated in FIG. 1a.

Figure 1A:
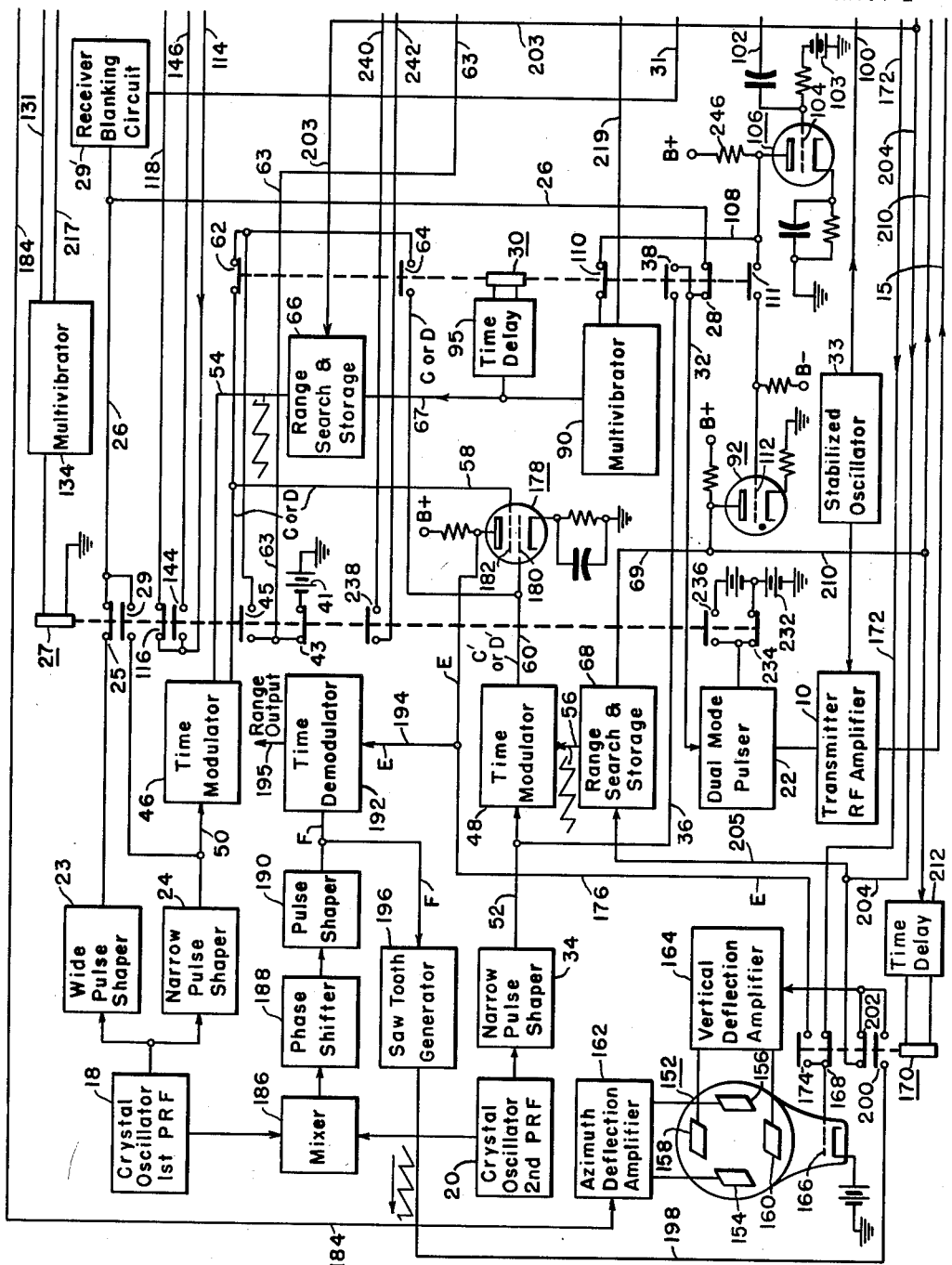

Referring to FIGS 1a and 1b, the circuit shown comprises a transmitter 10 and a receiver 12 coupled to a lobing feed horn 13 of a directional antenna 14 by a suitable fast-acting duplexer 16. Two crystal oscillators 18 and 20 having different output frequencies are provided. These oscillators are adapted to trigger a dual-mode klystron pulser 22 to generate pulses of radio frequency energy which are radiated from antenna 14 via transmitter 10, lead 15, duplexer 16 and antenna 14. The sine wave from oscillator 18 is formed into pulses in one of two pulse shapers 23 or 24, shaper 23 being adapted to produce a wide output pulse while shaper 24 is adapted to produce a narrow output pulse. The output of pulse shaper 23 is applied to lead 26 through the normally closed contacts 25 of relay 27; whereas, the output of pulse shaper 24 is adapted to be applied to lead 26 through the normally open contacts 29 of relay 27. From lead 26, the pulses from shaper 23 or 24, as the case may be, pass through the normally closed contacts 28 of relay 30 and lead 32 to pulser 22. Pulses on lead 26 are also applied to a receiver blanking circuit 29' which applies a pulse through lead 31 to receiver 12 to effectively disable the receiver during the pulse duration of each pulse from shaper 23 or 24. The pulse from pulser 22 is then used to turn on transmitter 10 which consists of an amplifying device supplied with radio frequency carrier energy from oscillator 33. Received energy pulses, after amplification in receiver 12, are applied via lead 31' to the control grid 40 of a pentode 42. Under normal conditions the bias on the suppressor grid 44 of pentode 40 is below cut-off, and the received voltage pulses applied to the control grid will not initiate conduction in the tube. Conduction can be initiated only by the presence of a pulse of sufficient voltage on suppressor grid 44 which will then permit the tube to pass the information.

The voltage pulses applied to suppressor grid 44 are supplied from one of two time modulators 46 or 48. as is well known to those skilled in the art, a time modulator comprises a circuit adapted to produce a train of uniformly spaced output pulses having a pulse repetition frequency equal to the repetition frequency of pulses transmitted from the radar system and controllable in phase relative to these transmitted pulses. As shown, pulses of the first repetition frequency are fed from pulse shaper 24 to time modulator 46 via a lead 50, and those of the other repetition frequency are fed to time modulator 48 from pulse shaper 34 via lead 52. The output pulses from the time modulators are positioned in phase with respect to the transmitted energy pulses from the radar system as a function of a direct current control voltage. This control voltage is fed to modulator 46 via lead 54, and to modulator 48 via lead 56. The output pulses from modulators 46 and 48 appear on leads 58 and 60, respectively. Although the functional description of the time modulators given above should suffice for purposes of the present specification, a full and detailed description of various types of time modulators may be found in "Waveforms," Volume 19, MIT Radiation Laboratory Series, by D. Sayre, McGraw-Hill Company, Inc., New York, 1949.

Under normal operating conditions, the suppressor grid 44 of pentode 42 is connected to potential source 41 through the normally closed contacts 43 of relay 27 and lead 63 to enable pentode 42 to amplify during the search phase of operation. However, output pulses from time modulator 46 are adapted to be applied to suppressor grid 44 through the normally closed contacts 62 of relay 30, normally open contacts 45 of relay 27 and lead 63. Output pulses from time modulator 48 are adapted to be applied to the suppressor grid 44 of pentode 42 through the normally open contacts 64 of relay 30, the normally open contacts 45 of relay 27 and lead 63.

Figure 4:

The direct current voltages for time modulators 46 and 48 are supplied from range search and storage circuits 66 and 68, respectively. The output of these circuits is a repetitive linearly decreasing voltage somewhat like a sawtooth waveform, as shown in FIG. 4. One type of range search and storage circuit which may be used in the present invention is shown and described in copending application Serial No. 524,016, filed July 25, 1955 (now Patent No. 2,879,503) and assigned to the assignee of the present application. For purposes of the present description, however, it will be sufficient to state that the range search and storage circuits 66 and 68 will produce output waveforms similar to that shown in FIG. 4 until they receive a signal on lead 67 or 69, respectively, which causes the circuit to stop its linear decrease in voltage at a certain voltage level and maintain that voltage level constant as shown at point 71 in FIG. 4. Alternatively, to accommodate a fast moving target, the voltage may be made to drift slowly from point 71. The rate of drift will be proportional to target velocity to compensate for a change in range of the target.

In operation, the output of the range search and storage circuits 66 and 68 will be a repetitive linear sawtooth controlling the phase position of the output pulses of time modulators 46 and 48, respectively. Upon detection of a signal signifying coincidence of target returns and the output pulses of time modulator 46 which have the same pulse repetition frequency as the target returns, monostable multivibrator 90 will actuate range circuit and storage circuit 66 to stop its linear decrease in voltage and hold its output voltage constant at a particular point along its linear fall. This voltage, then, is the one desired to phase the time modulator 46 to correctly position the pulses over the target returns. This resulting phase, represented by the magnitude of the direct current output voltage of circuit 66, now becomes the desired stored information.

As shown in FIG. 1a, the switching device for range search and storage circuit 66 is the multivibrator 90; whereas, the switching device for circuit 68 is a thyratron 92. The thyratron, also being a switching device, serves the same purpose as the multivibrator 90. As shown, multivibrator 90 also controls relay 30 through a time delay device 95.

The radar transmitter 10 sends out pulses of radio frequency energy at a particular frequency. In accordance with well-known Doppler theory, if these pulses of radio frequency energy should strike a stationary object, they will be reflected back to antenna 14 with the same frequency at which they were transmitted, assuming the radar set is stationary. If the radar set is mounted on an aircraft and the transmitted pulses strike a stationary object, they will be received back at the receiver with a shift in frequency proportional to the speed of the aircraft. If the transmitted pulses strike a moving object, they will experience a Doppler shift in frequency. It is desirable to separate the target returns from moving targets from those of stationary targets and to pass the moving target returns only to the detection and range tracking portion of the system. To this end coherent detector 94 and clutter blanking filter system 98 are provided. Essentially, the coherent detector 94 is a mixer which produces an output difference frequency. The target returns are mixed with the intermediate frequency output of dual frequency oscillator 33 which is fed to the coherent detector 94 through lead 100. Target returns from stationary targets fall within a rejection filter contained within the clutter blanking filtering system 98. However, target returns from moving targets, having experienced a Doppler shift in frequency, will pass from the coherent detector 94 and the clutter blanking filter system 98 to the variable filter circuit 96.

The filtering circuit 96 employed is essentially a band pass filter, one possible embodiment of which is shown and described in copending application, Serial No. 542,820, filed October 26, 1955 (now Patent No. 2,871,468), and assigned to the assignee of the present application. The functions of the variable filter circuit 96 are to further select a true target return which has experienced a Doppler shift in frequency and to minimize the equivalent noise bandwidth.

The output of variabel filter 96 will be a signal of a particular intermediate frequency indicating the existence of a moving target. This signal is applied via lead 102 to the grid 104 of triode 106 which has a suitable source of bias, such as battery 103, applied thereto to prevent passage of noise bursts. The output of the triode is, in turn, applied through lead 108 and the normally closed contacts 110 of relay 30 to multibibrator 90. The pulse from triode 106 is also adapted to be applied through normally open contacts 111 of relay 30 to grid 112 of the thyratron 92 which is normally held cut-off by a negative voltage applied to grid 112.

The output of coherent detector 94 is also applied through clutter blanking filtering system 98, lead 114, the normally closed contacts 116 of relay 27 and lead 118 to a bank of filters 120. Assuming that the radar set is mounted on a moving aircraft and antenna 14 is scanning through a predetermined pattern, the relative motion of the radar beam with respect to the stationary objects will vary periodically as the antenna scans from right through dead center to left, and then back again to its extreme right position. Consequently, clutter blanking filtering system 98 is provided to compensate for variations in the relative motion of the radar beam so that ground clutter can be filtered from the true target returns. Signals on lead 118 are applied to all of the filters in the bank of filters 120 which consists of a number of like filters progressively covering the band of expected frequencies. Each of these filters has a particular band bass which indicates a particular velocity of a moving target. When one of the filters encompasses a signal on lead 118, it will pass it to one of leads 122, amplitude detector or rectifier 124, narrow low pas filter 126, and a commutating device 128 to a threshold detector 130. When a signal is produced on the output lead of threshold detector 130, it will indicate the existence of a moving target. This output is applied via lead 131 to multivibrator 134 which actuates relay 27 to reverse the position of its contacts shown in FIG. 1a. The output of threshold detector 130 is also passed through lead 131 to the search pattern generator 136 to stop the generation of a search signal which controls the antenna drive 138. Thus, the antenna drive 138 and antenna 14, connected to and controlled by generator 136 through contacts 140 of relay 142, also stop whenever threshold detector 130 produces an output, indicating the existence of a moving target. This stoppage is only momentary, for as will be made clear hereinafter, the antenna search is started again after a brief time interval by a signal on lead 217.

The output of clutter blanking filtering system 98 is also adapted to be applied through lead 114, the normally open contacts 144 of relay 27 and lead 146 to a velocity track circuit 148, the output of which is adapted to be applied through normally open contacts 150 of relay 142 so that amplitude modulation produced by antenna lobing can produce an error signal for the antenna drive 138. The velocity track circuit 148, well known to those skilled in the art, functions to keep a filter centered on the target frequency to thereby cause the antenna drive 138 and antenna 14 to automatically track or follow a moving target after it is once detected by threshold detector 130.

Referring now the lower left hand corner of FIG. 1a there is shown a CRT display tube 152 having a pair of horizontal or azimuth deflection plates 154 and 156 and a pair of vertical deflection plates 158 and 160. Signals are applied to plates 154 and 156 through deflection amplifier 162; whereas, signals are applied to plates 158 and 160 through deflection amplifier 164. The grid 166 of the CRT tube is connected through the normally closed contacts 168 of relay 170 and lead 172 to the output of commutating device 128. Grid 166 is also adapted to be connected through the normally open contacts 174 of relay 170 and lead 176 to the output of coincidence stage 178 which comprises a vacuum tube having a grid 180 to which the output pulses from time modultor 48 are applied and a grid 182 to which the output pulses from time modulator 46 are applied. Whenever the output pulses from these two time modulators coincide on grids 180 and 182, the coincidence stage 178 will produce an output pulse on lead 176.

The azimuth deflection amplifier 162 receives a signal via lead 184 from search pattern generator 136 which causes the beam of the CRT tube to sweep across the screen of the tube and back again each time the antenna 14 scans through one cycle.

Referring now to crystal oscillators 18 and 20, the outputs of these two circuits are applied to a mixer circuit 186 which produces a sine wave output signal having a frequency equal to the difference of the frequencies of oscillators 18 and 20. This difference signal is applied through a phase shifter 188 and a pulse shaper 190 to a time demodulator 192. Output voltage pulses from coincidence stage 178 are applied via a lead 194 to the time demodulator 192. The time demodulator compares the phase of the voltage pulses from coincidence detector 178 with the phase of output pulses from pulse shaper 190 to produce a direct output current voltage on lead 195 which is proportional to the difference in phase between these two signals. This voltage is also proportional to true range and can be used to set the initial conditions in an automatic range tracking loop, not shown.

A description of one type of time demodulator which may be used with the present invention may be found in Chapter 14 of the above-mentioned volume 19, Radition Laboratory Series.

Output pulses from pulse shaper 190 are also used to trigger a sawtooth wave generator 196, the output of which is adapted to be applied through lead 198 and the normally open contacts 200 of relay 170 to vertical deflection amplifier 164. The vertical deflection amplifier 164, however, is normally controlled by a voltage passing through normally closed contacts 202 of relay 170 and lead 204 which is derived from a variable resistor 206 (FIG. 1b). This voltage is also used to aid the initial positioning of the variable bandwidth filtering system 96 through lead 201 and as a drift controlling voltage for range search and storage circuits 66 and 68 which are connected to lead 204 through leads 203 and 205, respectively. The variable resistor 206 is, in turn, controlled by a commutating control device 208 which serves to actuate the commutating device 128 to connect each of the leads for the various filters in the bank of filters 120 to threshold detector 130 in rapid succession.

The output of thyratron 92 is also applied through lead 210 to a time delay device 212 which, in turn, actuates relay 170. The thyratron output is also applied through lead 210, contacts 211 of switch 222 a time delay circuit 214 (FIG. 1b) and lead 217 to the search pattern generator 136 to start the generation of a search signal and thereby cause the antenna to start moving and resume its normal searching function after the antenna has been stopped by a signal on lead 131 due to the detection of a target to allow range to be measured. The output of circuit 214 is also applied via leads 217 and 219 to multivibrator 134 and 90, respectively, to reverse the states of the multivibrators and deenergize relays 27 and 30, assuming that contacts 211 of switch 222 are closed. Further, the signal from thyratron 92 is applied via lead 210 to the grid 218 of triode 220. Normally, triode 220 is non-conducting by virtue of the fact that contacts 221 of operator-operated switch 222 are open. When switch 222 is closed and a signal from thyratron 92 is applied to grid 218, the triode 220 will produce an output signal which passes through time delay circuit 224 to actuate relay 142. Actuation of relay 142 causes the system to go into track by causing contacts 140 to open and contacts 150 to close. In addition, it causes the normally open contacts 226 to close, thereby connecting a lobing control circuit to a source of voltage, such as battery 230. Whenever contacts 226 close, the lobing control circuit 228 will cause antenna feed horn 13 to move in a lobing pattern.

Supply voltage for the klystron of dual mode pulser 22 is supplied from an energy source, such as battery 232. When the contacts of relay 27 are in the position shown, voltage will be supplied to the pulser through normally closed contacts 234; whereas, when the position of the contacts is reversed, substantially more voltage will be supplied to the pulser through contacts 236. Normally open contacts 238 of relay 27 are connected through leads 240 and 242 to variable filter 96. When contacts 238 close, the bandwidth of variable filter 96 is materially reduced.

Figure 2:
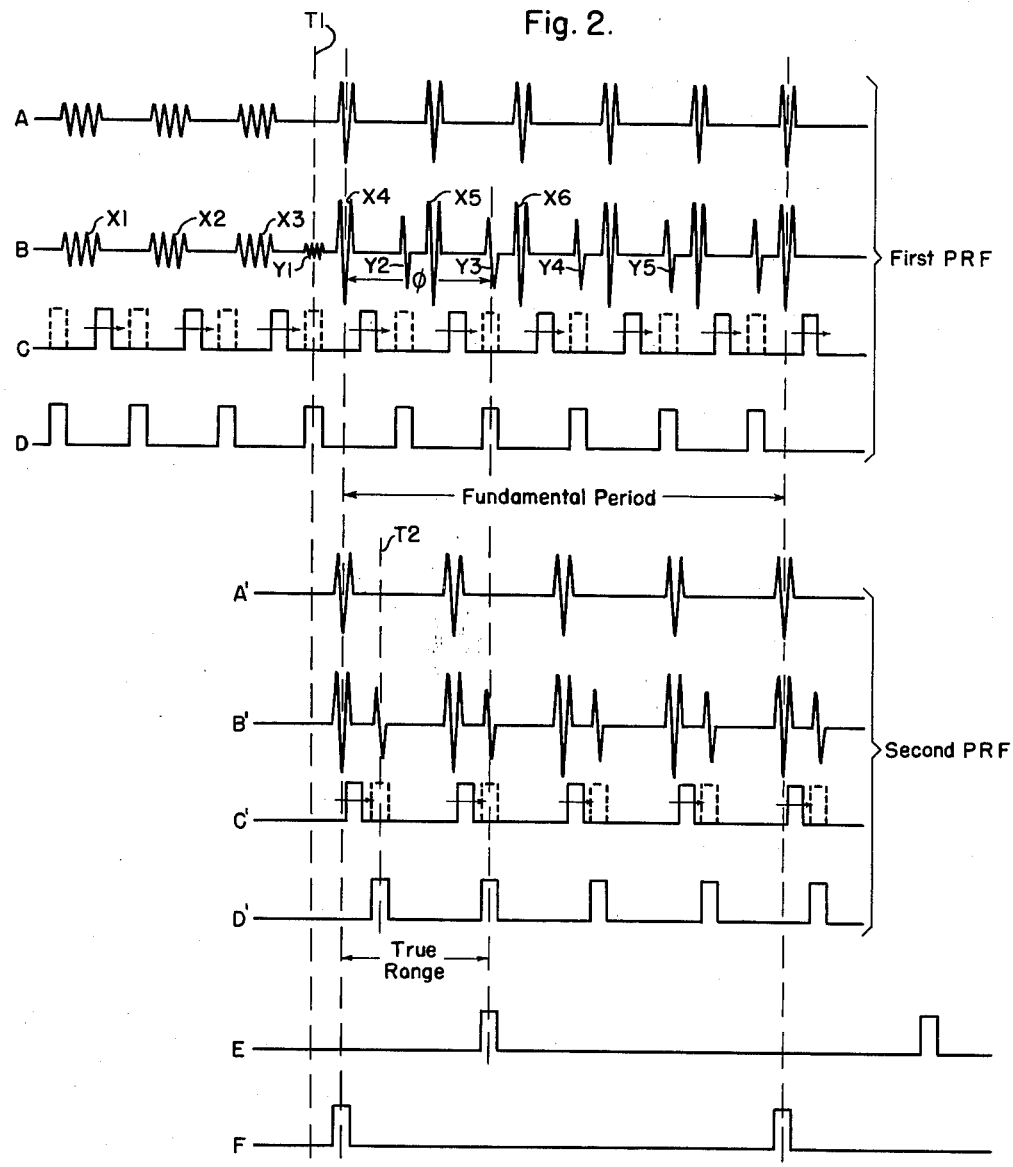
FIG. 2 is an illustration of waveforms appearing at various points in a circuit of FIG. 1.

Operation of the system may best be understood by reference to FIG. 2 which illustrates waveforms appearing at various points in the circuit of FIGS. 1a and 1b. The waveforms are identified by letters in FIG. 1 and the points at which these waveforms appear in FIG. 1 are indicated by like reference letters.

Under normal operating conditions when the radar system is searching for a moving target, the crystal oscillator 18 is connected to pulser 22 through wide pulse shaper 23, normally closed contacts 25 of relay 27, lead 26, normally closed contacts 28 of relay 30, and lead 32. Antenna 14 will be moved through a scanning pattern at this time by generator 136 and antenna drive 138, and the contacts of all of the relays will be in the positions shown. The signal of the first pulse repetition frequency transmitted from the transmitter 10 appears as waveform A in FIG. 2. It consists of a series of spaced pulses of radio frequency energy of relatively wide pulse width at the first pulse repetition frequency, in this case approximately 120 kilocycles. When the radar beam intercepts a target, the signal from receiver 12 will appear as waveform B. As each pulse is transmitted, a certain amount of radio frequency energy will be reflected to the receiving portion of the antenna 14 and will be detected by the receiver of the system. Receiver blanking circuit 29' effectively disables the receiver 12 during the time of pulse transmission to minimize this receiver leak through. However, a small portion of the transmitted energy will be detected by the receiver of the system so that a series of pulses X1, X2, X3, etc. will appear in the wave shape. Reflected energy pulses from a target are indicated pulses Y1, Y2, Y3, etc. The pulse repetition rate of the transmitted pulses is such that usually two or more pulses will be transmitted from the system before a reflected echo from the target can reach the antenna. This is a result of the high pulse repetition frequency required to facilitate high speed tragets; and in this manner the present system differs from a conventional radar system wherein the echo from one transmitted pulse is received by the system before the next subsequent pulse is transmitted. Thus, it is not apparent from an examination of the waveform B whether received pulse Y1, Y2 or Y3 is a reflected pulse of transmitted pulse X1. The pulses Y1, Y2 and Y3 will always be substantially equidistant (neglecting movement of the target) since their corresponding transmitted pulses are equidistant. For purposes of the present explanation, it will be assumed, for example, that Y3 is a reflected pulse of X4. Consequently, the distance $\phi$ indicates true range.

When the antenna is searching or scanning prior to the detection of a target, it is desirable to employ a high duty signal or wide pulse width in the transmitted pulses to achieve maximum range performance. Thus, to the left of time T1 indicated in FIG. 2, the transmitted pulses have a relatively wide pulse width. When the first target return Y1 is received by the radar system at time T1, it will be applied via lead 31' to the grid 40 of pentode 42. At this time tube 42 is able to conduct by virtue of voltage supplied to grid 44 from potential source 41 connected through contacts 43 of relay 27 and lead 63. Assuming the received signal has experienced a Doppler shift in frequency, a signal from coherent detector 94 will be applied via clutter blanking filtering system 98, lead 114, normally closed contacts 116 of relay 27, and lead 118 to the bank of filters 120. The signal will pass through one of these filters, detector 124, low pass filter 126, and commutating device 128 to threshold detector 130. In actual practice, several target returns may be received before the commutating device connects the particular filter through which the signal passes to the threshold detector 130. However, we will assume in this case that the timing of the commutating device 128 is such that the first target return passes through. If the amplitude of the target return is great enough, it will pass through threshold detector 130 and will produce a voltage on lead 131 which triggers multivibrator 134 to deenergize relay 27, thereby causing the contacts of relay 27 to reverse their positions shown in FIG. 1a. Now, the output of the crystal oscillator is applied through narrow pulse shaper 24 and contacts 29, rather than wide pulse shaper 23, to pulser 22. Thus, at time T1, as shown in FIG. 2, the pulse width of the transmitted pulses is materially decreased to facilitate measurement of true range and to minimize problems in tracking through ambiguous range intervals between which the received echo may be eclipsed by a transmitted pulse.

If the pulse width alone were narrowed, the average power transmitted from the radar system would decrease, since the pulser would be operating during a shorter period as each pulse is transmitted. In order to achieve an acquisition range equal to the detection range and to insure maintenance of lock-on once a target is detected, it is desirable to maintain the same average transmitted power, regardless of the pulse width. Hence, it is desirable to increase the peak power output of the dual-mode pulser 22 to effectively increase the amplitude of the transmitted pulses to compensate for their decrease in width. This is done in the present embodiment of the invention by opening contacts 234 and closing contacts 236 when relay 27 is deenergized at time T1 to apply a greater voltage from battery 232 to the pulser 22.

When relay 27 is deenergized, it also closes contacts 238 to thereby narrow the bandwidth of variable filtering system 96. Thus, the effective bandwidth of the filter 96 is relatively wide before a target is detected to permit a faster build up of target information; whereas, when the target is detected, the bandwidth of the filter is decreased to improve range performance which is proportional to the ratio of transmitted power divided by the bandwidth of the filter.

When threshold detector 130 produces an output it is applied to the search pattern generator 136 to stop the generation of a search signal, thereby forcing antenna drive 138 and antenna 14 to stop also. In this way, considerably more information about the target can be fed to the radar system during the pause. As previously stated, the antenna is made to continue searching after a pause by a signal on lead 217 supplied by other circuitry, the operation of which will hereinafter be described.

The deenergization of relay 27 upon detection of a target also opens contacts 116 and closes contacts 144. Thus, the output of clutter blanking filter 98 on lead 114 is connected through lead 146 to velocity track circuit 148, which ultimately functions to direct antenna drive 138 to cause antenna 14 to automatically track a target after it is once detected. The output of velocity track 148, however, will be ineffective to drive antenna 14 as long as contacts 150 of relay 142 are open, i.e., until the system eventually goes into the tracking condition.

It should be noted that contacts 43 of relay 27 will open and contacts 45 will close upon target detection when relay 27 becomes deenergized. Thus, the output pulses of time modulator 46 are now connected to grid 44 in pentode 42 through normally closed contacts 62 of relay 30, contacts 45 of relay 27 and lead 63. Pentode 42 will now produce an output pulse only upon coincidence of a pulse from time modulator 46 on grid 44 with a target return on grid 40.

Referring again to coherent detector 94, signals passing through the detector will pass through variable filter 96 and lead 102 to grid 104 of triode 106. Before a target is detected by the system at time T1, multivibrator 90 will permit range search and storage circuit 66 to produce a sawtooth waveform signal similar to that shown in FIG. 4. Hence, range search and storage circuit 66 will supply a recurring sawtooth waveform to time modulator 46. Output pulses from time modulator 46 are applied via contacts 62, contacts 45 and lead 63 to grid 44 of pentode 42. These output pulses appear as waveform C in FIG. 2. The linearly decreasing output voltage from range search and storage circuit 66 causes the output pulses from the time modulator to sweep to the right through the interval between transmitted pulses. When the pulses in waveform C reach the position shown by the dotted lines, one of the puses will coincide with the target return Y2.

When a true target return thus passes through pentode 42 and filtering system 96 at time T1 and is applied to grid 104 of triode 106, the output of the triode will be applied via lead 108 and normally closed contacts 110 to multivibrator 90. The multivibrator 90 is, therefore, switched from one stable state to the other, and it applies a stop-search potential to range search and storage circuit 66. This causes the range search and storage circuit to maintain its output voltage constant, or drift slightly in a manner determined by a voltage proportional to velocity on lead 203, in accordance with the explanation given above. As a result, the output voltage pulses from time modulator 46, which are applied to grid 182 in coincidence detector 178, are maintained in coincidence with the return target signals as shown by waveform D in FIG. 2.

The output from multivibrator 90 also actuates the relay 30 through time delay device 95 to reverse the position of its contacts. Consequently, crystal oscillator 18 is now disconnected from pulser 22, since contacts 28 are now open, and crystal oscillator 20 is connected to the pulser 22 through pulse shaper 34, lead 36, contacts 38, and lead 32. A signal of a second pulse repetition frequency, shown as a waveform A' in FIG. 2, is now transmitted from the system. For illustrative purposes, five pulses at the second pulse repetition frequency are shown transmitted over a time interval during which six pulses at the first pulse repetition frequency were transmitted. Returned echos at the second pulse repetition frequency are now applied to the control grid 40 of pentode 42. However, time modulator 48 is now connected to suppressor grid 44 via contacts 64 and lead 63, and range search and storage circuit 68 is operative by virtue of the fact that the grid 112 of thyratron 92 is connected to a source of negative potential to render it non-conducting. Range search and storage circuit 68 will, therefore, apply a repetitive sawtooth waveform to time modulator 48 which will, in turn, supply a series of output pulses (waveform C') at the second pulse repetition frequency which are periodically swept over a range equal to the distance between successive transmitted pulses. These pulses are applied via contacts 64 to grid 44 in pentode 42. The output pulses of the time modulator 48 are also applied to grid 180 in coincidence detector 178. When the pulses from modulator 48 on grid 44 coincide with the target returns on grid 40 at the second pulse repetition frequency, the signal which passes through coherent detector 94, variable filter 96, triode 106, and contacts 111 to grid 112 in thyratron 92, initiate conduction in the thyratron, thereby stopping the linear run-down in voltage of range search and storage circuit 68. The range search and storage circuit will hold its output constant at this point, or allows it to drift slowly in proportion to the velocity voltage supplied via lead 205, and the output of the time modulator 48 will appear as waveform D' in FIG. 2.

The waveforms D and D' are thereupon compared in coincidence detector 178. It can be seen that only the second output pulse of time modulators 46 and 48 coincide. Consequently, coincidence detector 178 will apply an output to the time demodulator 192 at this point, the output pulses in the coincidence detector appearing as waveform E. The difference frequency output of pulse shaper 190 will appear as waveform F in FIG. 2. The demodulator 192 will compare the phase difference between the pulses in waveforms E and F to produce an output voltage indicating true range. This output voltage may then be used to initiate conditions in a range tracking circuit, not shown.

Figure 3:
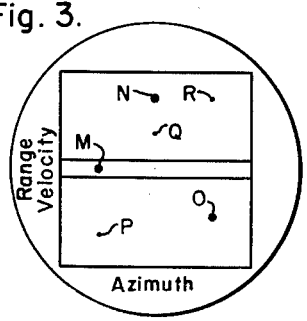
FIG. 3 is an illustration of one type of CRT display that may be used in conjunction with the present invention.

When thyratron 92 is rendered conducting upon the coincidence of a target return in waveform B' with the output pulses from time modulator 48 in waveform C' at time T2, the output signal of thyratron 92 actuates relay 170 through time delay 212. The output of the thyratron is also applied through lead 210, contacts 211 of switch 222, and time delay 214 which has a greater delay than circuit 212, to the search pattern generator 136 to cause it to resume its operation. Before thyratron 92 fires, the vertical deflection plates 158 and 160 are controlled by the position of commutating control device 208. Thus, the position of the electron stream along the vertical axis of the face of the CRT tube will indicate the velocity of the target, since each position of the contact on resistor 206 indicates that a particular region of the filters in the bank of filters 120 is connected to threshold detector 130, and that a signal passing through the filter of that particular region corresponds to a certain predetermined velocity region. In FIG. 3 the dots produced by the electron stream during this time are indicated as M, N, and O. The azimuth deflection plates 154 and 156 are controlled through lead 184 by search pattern generator 136. Thus, referring to FIG. 3, when the antenna was left of dead center, a target having a velocity proportional to the distance of dot M from the bottom of the display was detected. When the antenna was at dead center, it detected a target indicated by the dot N having a much higher velocity than that indicated by dot M. When the antenna swung to the right of dead center, it detected a target, the velocity of which is represented by dot O. When thyratron 92 fires, relay 170 becomes energized after a predetermined time delay and contacts 174 and 200 close while contacts 168 and 202 open. Now the grid 166 of the CRT tube is connected to the output of coincidence detector 178; whereas, the vertical deflection plates 158 and 160 are controlled by the sawtooth generator 196 which sweeps the electron beam across the face of the CRT tube during the time interval between successive time pulses at the difference frequency between the two pulse repetition frequencies. As will be understood, when pulses from time modulators 48 and 46 coincide on grids 180 and 182 of coincidence detector 178, the output of the coincidence detector applied to grid 166 will produce a spot on the face of the CRT tube, the position of which from the bottom of the display is proportional to the range of the particular target. Again the azimuth deflection plates 154 and 156 are connected to search pattern generator 136 so that a target with a velocity indicated by dot M has a range indicated by dot P; a target having a velocity indicated by dot N has the velocity indicated by Q; and a target having a velocity indicated by dot O has a range indicated by R. Dots M, N, and O can be differentiated from dots P, Q, and R by different color, edge lighting or by any other means well known to those skilled in the art.

If the pilot observing the display wishes to track a particular target, he does so by velocity selection. That is, he will adjust commutating control device 208 by means of a rheostat 248 or other suitable means so that the commutating device will connect threshold detector 130 to only one of the filters in the bank of filters 120 corresponding to the velocity of the target which he desires to track. The rheostat 248 may be calibrated to correspond to calibrations on the CRT display tube so that a particular target may be bracketed or identified in velocity. At the same time, the pilot will close contacts 222. Now, when the signal from the particular target which the pilot desires to track fires thyratron 92, the output of the thyratron applied through lead 210 to grid 218 of triode 220 will actuate relay 142 through time delay device 224, thereby closing contacts 150 and 226 and opening contacts 140. Relays 27 and 30 remain energized since contacts 211 of switch 222 are open and the velocity track circuit 148 is now connected to the antenna drive 138 to cause the antenna to follow a particular selected target. In addition, the feed horn 13 of the antenna 14 is caused to rotate through a lobing pattern by the lobing control 228.

Although the invention has been described in connection with a certain specific embodiment, it should be readily apparent to those skilled in the art that various changes in form and arrangement in parts can be made to suit requirements without departing from the spirit and the scope of the invention.

We claim as our invention:

1. In a pulse Doppler radar system, pulse transmitter means for transmitting pulses of wave energy, receiver means for receiving transmitted energy pulses reflected from a distant object, detecting means coupled to said receiving means for detecting at least one predetermined received energy pulse having a Doppler shift in frequency, and control means including a relay device responsive to the output of said detecting means and operatively connected to said transmitter means for changing the duty cycle of transmitted energy pulses when said received energy pulse having a Doppler shift in frequency is first detected by said detecting means.

2. In a pulse Doppler radar system, pulse transmitter means for transmitting pulses of wave energy, receiving means for receiving transmitted energy pulses reflected from a distant object, filter means coupled to said receiving means for detecting a predetermined one received energy pulse of a group of received pulses having a Doppler shift in frequency, and control means responsive to the output of said filter means for changing the duty cycle of transmitted energy pulses when said predetermined received energy pulse having a Doppler shift in frequency is first detected by said filter means.

3. In a pulse Doppler radar system, a source of spaced energy pulses, power control means for establishing the peak power of said energy pulses at a predetermined level, transmitting means for transmitting the spaced energy pulses, receiving means for receiving transmitted energy pulses reflected from a distant object, detecting means coupled to said receiving means for detecting a predetermined received energy pulse having a Doppler shift in frequency, and actuating means responsive to the output of said detecting means for actuating said first-mentioned power control means to change the peak power of said energy pulses when said predetermined received energy pulse having a Doppler shift in frequency is first detected by said detecting means.

4. In a pulse Doppler radar system, means for transmitting pulses of wave energy, means for receiving transmitted energy pulses reflected from a distant target, a plurality of signal channels all connected in parallel, a filter in each of said channels tuned to the Doppler frequency of a signal received from a moving target having a particular velocity, means for applying the output of said receiving means to each of said parallel channels, means for detecting a signal passing through any one of said channels, a commutating device for connecting each of said channels to said detecting means in succession, and means responsive to the output of said detecting means for changing the duty cycle of transmitted energy pulses when a received energy pulse having a Doppler shift in frequency is first detected by said detecting means.

5. In a pulse Doppler radar system, a source of spaced energy pulses, means for establishing the peak power of said energy pulses at a predetermined level, means for transmitting the spaced energy pulses, means for receiving transmitted energy pulses reflected from a distant target, a plurality of signal channels all connected in parallel, a filter in each of said channels tuned to the Doppler frequency of a signal received from a moving target having a particular velocity, means for applying the output of said receiving means to each of said parallel channels, means for detecting a signal passing through any one of said channels, a commutating device for connecting each of said channels to said detecting means in succession, and means responsive to the output of said detecting means for actuating said first-mentioned means to increase the peak power of said energy pulses when a received energy pulse having a Doppler shift in frequency is first detected by said detecting means.

6. In a pulse Doppler radar system, a source of spaced energy pulses, means for establishing the peak power of said energy pulses at a predetermined level, means for transmitting the spaced energy pulses, means for receiving transmitted energy pulses reflected from a distant target, means coupled to said receiving means for detecting a received energy pulse having a Doppler shift in frequency, and means responsive to the output of said detecting means for changing the duty cycle of transmitted energy pulses and for actuating said first-mentioned means to increase the peak power of said energy pulses when a received energy pulse having a Doppler shift in frequency is first detected by said detecting means.

7. In a pulse Doppler radar system, a source of spaced energy pulses, means for establishing the peak power of said energy pulses at a predetermined level, means for transmitting the spaced energy pulses, means for receiving transmitted energy pulses reflected from a distant target, a plurality of signal channels all connected in parallel, a filter in each of said channels tuned to the Doppler frequency of a signal received from a moving target having a particular velocity, means for applying the output of said receiving means to each of said parallel channels, means for detecting a signal passing through any one of said channels, commutating means for connecting each of said channels to said detecting means in succession, and means responsive to the output of said detecting means for changing the duty cycle of transmitted energy pulses and for actuating said first-mentioned means to increase the peak power of said energy pulses when a received energy pulse having a Doppler shift in frequency is first detected by said detecting means.

8. In a pulse Doppler radar system, means for normally transmitting a train of energy pulses having a first pulse repetition frequency, means for receiving a train of energy pulses reflected from a distant object, means coupled to said receiving means for detecting a received energy pulse having a Doppler shift in frequency, means responsive to the output of said detecting means for changing the duty cycle of transmitted energy pulses when a received energy pulse having a Doppler shift in frequency is first detected by said detecting means, means for producing a first train of voltage pulses corresponding to a train of energy pulses of said first pulse repetition frequency received by said receiving means, means adapted to cause said transmitting means to change the pulse repetition frequency of its transmitted pulses from said first repetition frequency to a second pulse repetition frequency upon coincidence of a pulse in said first train with a received energy pulse, means for producing a second train of voltage pulses corresponding to a train of energy pulses of said second pulse repetition frequency received by said receiving means, means for comparing the phase of said second train of voltage pulses with received energy pulses at said second pulse repetition frequency to produce an output signal upon coincidence of a pulse in said second train with a received energy pulse at said second pulse repetition frequency and means responsive to said output signal to cause said transmitting means to change the pulse repetition frequency of its transmitted pulses from said second repetition frequency to said first repetition frequency and to again change the duty cycle of transmitted energy pulses.

9. In a pulse Doppler radar system, means for normally transmitting a train of energy pulses having a first pulse repetition frequency, means for receiving a train of energy pulses reflected from a distant object, selective filter means coupled to said receiving means for detecting a received energy pulse having a Doppler shift in frequency, means including a relay device responsive to the output of said detecting means for decreasing the duty cycle of transmitted energy pulses when a received energy pulse having a Doppler shift in frequency is first detected by said filter means, means for producing a first train of voltage pulses corresponding to a train of energy pulses of said first pulse repetition frequency received by said receiving means, means to cause said transmitting means to change the pulse repetition frequency of its transmitted pulses from said first repetition frequency to a second pulse repetition frequency upon phase coincidence of a pulse in said first train with a received energy pulse at said first pulse repetition frequency, means for producing a second train of voltage pulses corresponding to a train of energy pulses of said second pulse repetition frequency received by said receiving means, and means responsive to phase coincidence of a pulse in said second train with a received energy pulse at said second pulse repetition frequency to change the pulse repetition frequency of the transmitted pulses from said second repetition frequency to said first repetition frequency and to increase the duty cycle of transmitted energy pulses.

10. In a pulse Doppler radar system, a source of spaced energy pulses of a first pulse repetition frequency, means for establishing the peak power of said energy pulses at a predetermined level, means for transmitting the spaced energy pulses of said first pulse repetition frequency, means for receiving a train of energy pulses of said first repetition frequency reflected from a distant object, means coupled to said receiving means for detecting a received energy pulse having a Doppler shift in frequency, means responsive to the output of said detecting means for actuating said first-mentioned means to increase the peak power of said energy pulses at said first repetition frequency when a received energy pulse at said first repetition frequency having a Doppler shift in frequency is first detected by said detecting means, means for producing a first train of voltage pulses corresponding to a train of energy pulses of said first pulse repetition frequency received by said receiving means, a source of spaced energy pulses having a second pulse repetition frequency, means to cause said transmitting means to transmit said source of energy pulses of said second pulse repetition frequency, means for producing a second train of voltage pulses corresponding to a train of energy pulses of said second pulse repetition frequency received by said receiving means, and means responsive to phase coincidence of a pulse in said second train with a received energy pulse at said second repetition frequency for causing said transmitting means to transmit said source of pulses of said first repetition frequency and to actuate said first-mentioned means to decrease the peak power of pulses transmitted at said first pulse repetition frequency.

11. In a pulse Doppler radar system, transmitting means for transmitting pulses of wave energy, receiving means for receiving transmitted energy pulses reflected from a distant target, a plurality of signal channels all connected in parallel, a filter in each of said channels respectively tuned to a different predetermined Doppler frequency of a signal received from a moving target having a particular velocity, means for applying the output of said receiving means to each of said parallel channels, detecting means for detecting a signal passing through any one of said channels, and control means responsive to the output of said detecting means for changing the duty cycle of transmitted energy pulses when a received energy pulse having a Doppler shift in frequency is first detected by said detecting means.

12. In a pulse Doppler radar system, a source of spaced energy pulses, means for establishing the peak power of said energy pulses at a predetermined level, means for transmitting the spaced energy pulses, means for receiving transmitted energy pulses reflected from a distant target, a plurality of signal channels all connected in parallel, means for applying the output of said receiving means to each of said parallel channels, means for detecting a signal passing through any one of said channels, and means responsive to the output of said detecting means for actuating said first-mentioned means to increase the peak power of said energy pulses when a received energy pulse having a Doppler shift in frequency is first detected by said detecting means.

References Cited in the file of this patent

UNITED STATES PATENTS 2,568,441     Fyler ------------------ Sept. 18, 1951